United States Patent
Borries et al.

(10) Patent No.: US 6,186,271 B1
(45) Date of Patent: Feb. 13, 2001

(54) HUNTING STAND AND GAME CARRIER

(76) Inventors: Samuel D. Borries, 14812 Glendale Rd., Ocean Springs, MS (US) 39564; Michael G. Scarborough, 15272 Lamey Bridge Rd., Biloxi, MS (US) 39530

( * ) Notice: Under 35 U.S.C. 154(b), the term of this patent shall be extended for 0 days.

(21) Appl. No.: 09/270,530

(22) Filed: Mar. 17, 1999

(51) Int. Cl.[7] ................................................. A01M 31/00
(52) U.S. Cl. ............................................ 182/20; 182/129
(58) Field of Search .......................... 182/20, 116, 187, 182/129; 248/168

(56) References Cited

U.S. PATENT DOCUMENTS

| | | | |
|---|---|---|---|
| 3,490,558 | * 1/1970 | Foley | 182/129 |
| 4,045,040 | 8/1977 | Fails . | |
| 4,997,152 | * 3/1991 | Wagman | 248/168 |
| 5,009,283 | * 4/1991 | Prejean | 182/187 |
| 5,052,516 | 10/1991 | Jamieson . | |
| 5,064,020 | * 11/1991 | Eagleson | 182/187 |
| 5,195,611 | * 3/1993 | Untz | 182/187 |
| 5,242,030 | 9/1993 | Lobozzo . | |
| 5,295,556 | 3/1994 | Mullin . | |
| 5,564,523 | 10/1996 | Howard . | |
| 5,839,538 | * 11/1998 | Magyar | 182/20 |

FOREIGN PATENT DOCUMENTS

| | | | |
|---|---|---|---|
| 489147 | * 5/1928 | (DE) | 182/116 |
| 1344461 | * 12/1963 | (FR) | 182/20 |
| 2352494 | * 1/1978 | (FR) | 182/116 |

OTHER PUBLICATIONS

"Ol'man Treestands and Accessories 1999", L&L Enterprises, 32 Raspberry Lane, Hattiesburg, MS 39402.

Ol'man Family for 1998; Treestands and Accessories, L&L Enterprises, 32 Raspberry Lane, Hattiesburg, MS 39402.

API Steel Ladder Stands and Steel Stick brochure, "The Grand Slam™ P.A.L.S."

* cited by examiner

*Primary Examiner*—Alvin Chin-Shue
(74) *Attorney, Agent, or Firm*—Pillsbury Madison & Sutro LLP

(57) ABSTRACT

A collapsible hunting-stand and game-carrier assembly comprising a seat structure; at least three legs associated with the seat structure, where the legs are comprised of respective upper and corresponding lower sections movable relative to each other between (a) a deployed position, in which the upper sections are substantially aligned with and supported by the corresponding lower sections to extend the legs away from the seat structure and provide part of a free-standing multi-pod base from which the seat structure is elevated above the ground, and (b) a collapsed position, in which the lower sections are folded back towards the upper leg sections so that the assembly is transportable; and a plurality of climbing aids connected to at least one leg, the climbing aids being relatively spaced (a) to provide the user with access to the seat structure when the legs are in the deployed position and (b) to provide a carrier base for holding game when the legs are in the collapsed position.

24 Claims, 7 Drawing Sheets

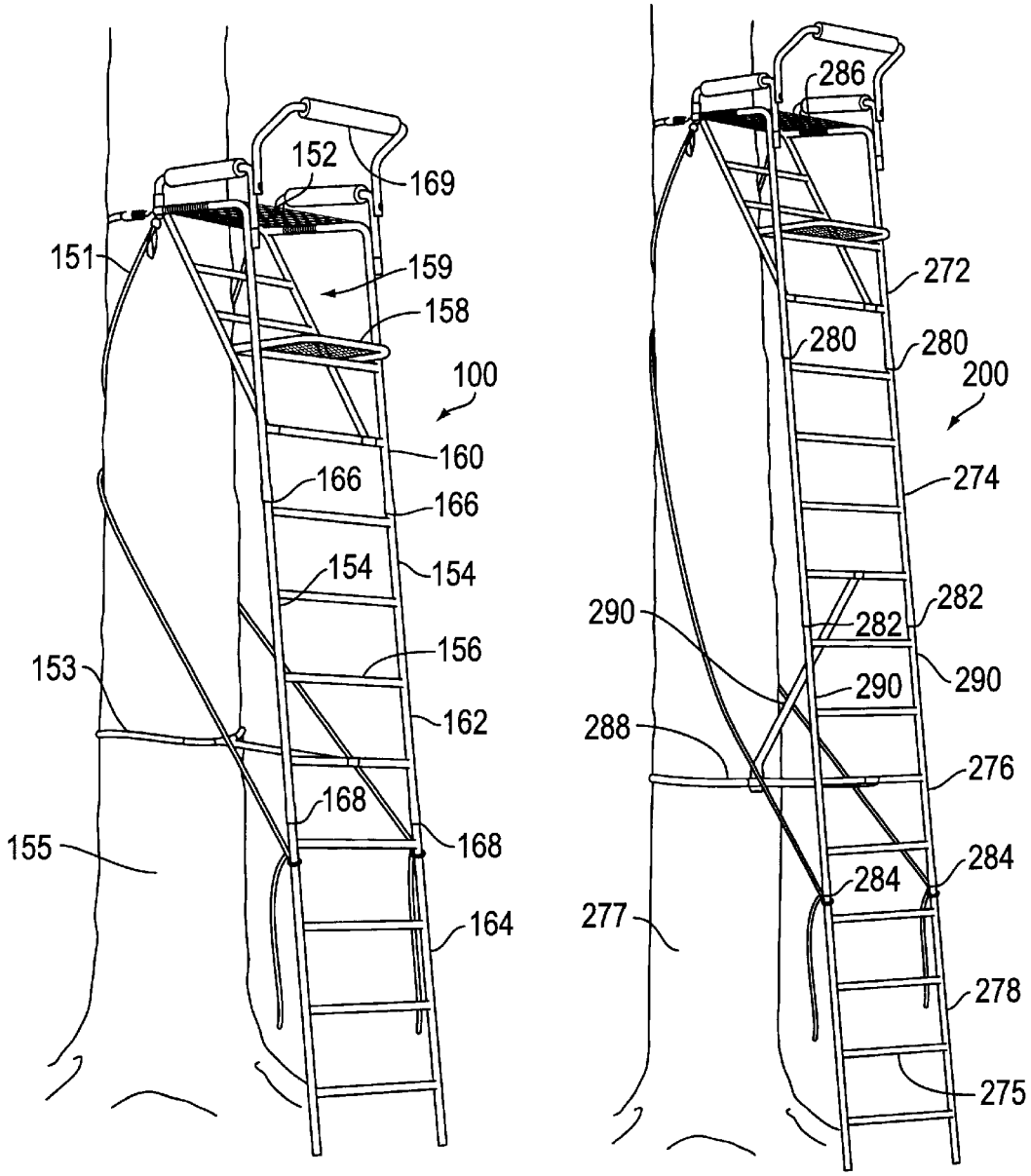
FIG. 4
FIG. 5
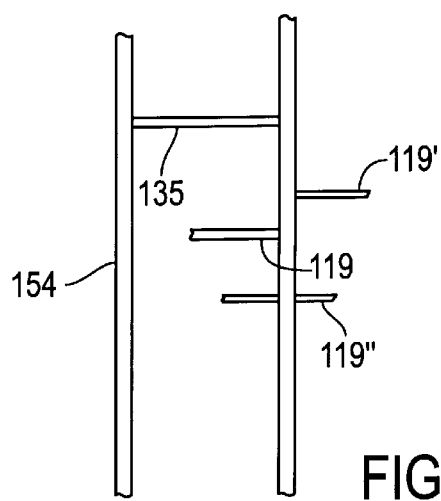
FIG. 4A

HUNTING STAND AND GAME CARRIER

BACKGROUND OF THE INVENTION

1. Field of the Invention

The present invention relates to a hunting apparatus, and more particularly to a combination hunting stand and game carrier which is readily convertible between those two separate functional utilities, and is easily portable.

2. Description of the Related Art

The use of an elevated hunting stand is commonly known to game hunters, particularly with respect to hunting deer. Often, hunters use portable hunting stands in locations which do not permit erection of permanent hunting stands (such as, for example, on public or federal land).

Portable deer stands which are known in the art are those which are carried to a hunting site, assembled, and attached to a tree. U.S. Pat. No. 5,052,516 to Jamieson teaches such a deer stand. This stand comprises a seat and footrest, each of which are attached to a tree trunk for hunting in an elevated position. A drawback of the deer stand of the type shown by Jamieson is that the hunter must physically carry or otherwise haul the stand to and from the desired hunting location. In addition, the deer stand of Jamieson must be physically transported up a tree and attached to the tree in order to be used. Accordingly, this deer stand does not provide an easily portable, stable, reliable support for the hunter, and following a successful hunt the stand and the deer must be hauled from the hunting site.

U.S. Pat. No. 5,564,523 to Howard relates to a portable collapsible deer stand comprising a trailer, base, and stand structure. The portable deer stand of Howard is a complicated device which requires the use of another vehicle, such as a truck, in order to transport the stand to and from the hunting location. This requirement limits potential hunting spots to those which can be reached by truck, and prohibits the use of this stand in remote or heavily wooded areas.

Hunting stands are also known which operate as both stands and game carriers. For example, U.S. Pat. No. 4,045,040 to Fails discloses a collapsible stand and game carrier where the game is chained to a ladder portion of the hunting stand and the entire assembly is attached to a backpack and dragged behind the hunter. This structure is cumbersome and does not allow the hunter the option of carrying equipment on the game carrier. Another drawback of this stand is that the hunter cannot visually monitor the game during transportation, since the game carrier is transported behind the hunter.

Similarly, U.S. Pat. No. 5,242,030 to Lobozzo shows a ladder-type hunting stand which may be used as a game carrier. This stand has a roller assembly which allows the hunter to roll a game-laden carrier, but this approach is also pulled by the hunter and is thus behind him as he leaves the hunting site. Also, Lobozzo's stand must be attached to a tree in order for it to be used as a hunting stand, and it does not collapse to any form of a compact configuration. Also, because the Lobozzo stand is pulled behind the hunter it does not permit that hunter to monitor his cargo as he is traveling.

U.S. Pat. No. 5,295,556 to Mullin discloses a multi-purpose hunting apparatus that is convertible between a cart, a sled, a tree stand, and a free-standing deer stand. This apparatus requires a number of parts such as straps, guard rails, handles, and skis, depending upon how the apparatus will be used. As such, the apparatus is difficult to assemble and transport.

SUMMARY OF THE INVENTION

It is, therefore, an object of this invention to provide an assembly that is easily assembled into a free-standing hunting stand and can be converted by being partially collapsed into, and form a game carrier which can be push-rolled in front of the hunter. Also, the structure can be more fully collapsed into a storable condition. In accordance with the principles of this invention, this objective is attained by the provision of a collapsible hunting-stand and game-carrier assembly that can be easily pushed in front of the hunter. When erected the stand includes front and rear leg structures that, when arranged into a deployed position, collectively form a free-standing "multi-pod" structure with an elevated seat. The front leg structures have respective upper and corresponding lower sections that collapse, for example by pivoting about connecting articulating joints or hinges. In the deployed position, the various leg sections are substantially aligned so that the leg structures extend away from the seat, providing part of the free-standing multi-pod base. Movement of the legs into the collapsed position, causes the whole structure to be folded into a transport unit that is easily moved and can be used to haul game from the hunting site. A plurality of climbing aids, such as bars, rings, rungs or other like structures, can extend from or between either the front leg structures or the rear leg structures. Where rungs are used they should be spaced apart relative to each other to define a ladder structure for providing the user with access to the elevated seat when the hunting-stand and game-carrier is in the deployed position. The same would be true for climbing rings or bars on one or more of the legs. Also, the rungs or climbing bars provide a carrier base for holding game when the leg structures are in the collapsed position.

Another object of the present invention is to provide a hunting-stand and game-carrier assembly that can easily be assembled into a tree-stand. In accordance with another embodiment of the invention, this and other objects are attained by the provision of a hunting-stand and game-carrier assembly including at least two legs connected to a seat. Each leg has upper and lower sections that are collapsible, for example by pivoting relative to each other. The sections of the legs move between a deployed position and a collapsed position. In the deployed position, the various leg sections are substantially aligned so that the leg structures extend away from the seat, thereby enabling the seat structure to be elevated above the ground and supported against a stationary structure, such as a tree. Climbing aides such as bars, rings, rungs, or the like extend from or between the leg structures. The climbing aids are spaced relative to each other and constructed to provide the user with access to the elevated seat when the assembly is in the deployed position. In the collapsed position the lower sections are folded back towards the upper leg sections. A plurality of rungs extend between the legs. The climbing aids also provide a carrier base for holding game when the legs are in the collapsed position. Cross-supports are provided to maintain relative positioning of the legs when in the deployed position, where at least one of the cross-supports is rigid and constructed and arranged to be horizontally oriented and to rest against a stationary structure when the assembly is in the deployed position.

These and other objects, features, and advantages of the present invention will become apparent from the following detailed description of the invention when taken in conjunction with the accompanying figures which illustrate, by way of example, the principles of this invention.

BRIEF DESCRIPTION OF THE DRAWINGS

The accompanying drawings serve to further elucidate the principles of the present invention. In such drawings:

FIG. 4 is a schematic view of a conventional hunting-stand and game-carrier assembly as supported by a stationary structure in accordance with another embodiment of the invention;

FIG. 4A is a schematic view of a hunting-stand and game-carrier assembly having climbing bars.

FIG. 5 is a schematic view of the hunting-stand and game-carrier assembly of FIG. 4, shown in a further elevated position;

DETAILED DESCRIPTION OF THE INVENTION

Figure 1:
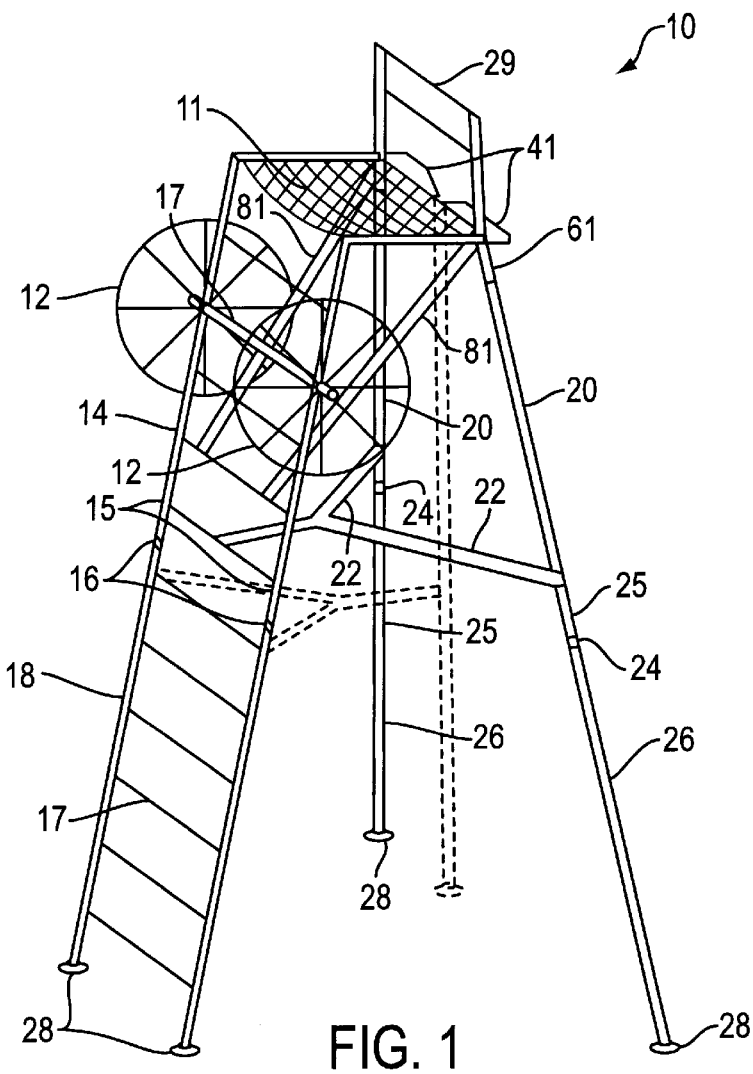
FIG. 1 is a schematic view of a free-standing hunting-stand and game-carrier assembly in accordance with an embodiment of this invention, depicted in a fully deployed position.
Figure 1A:
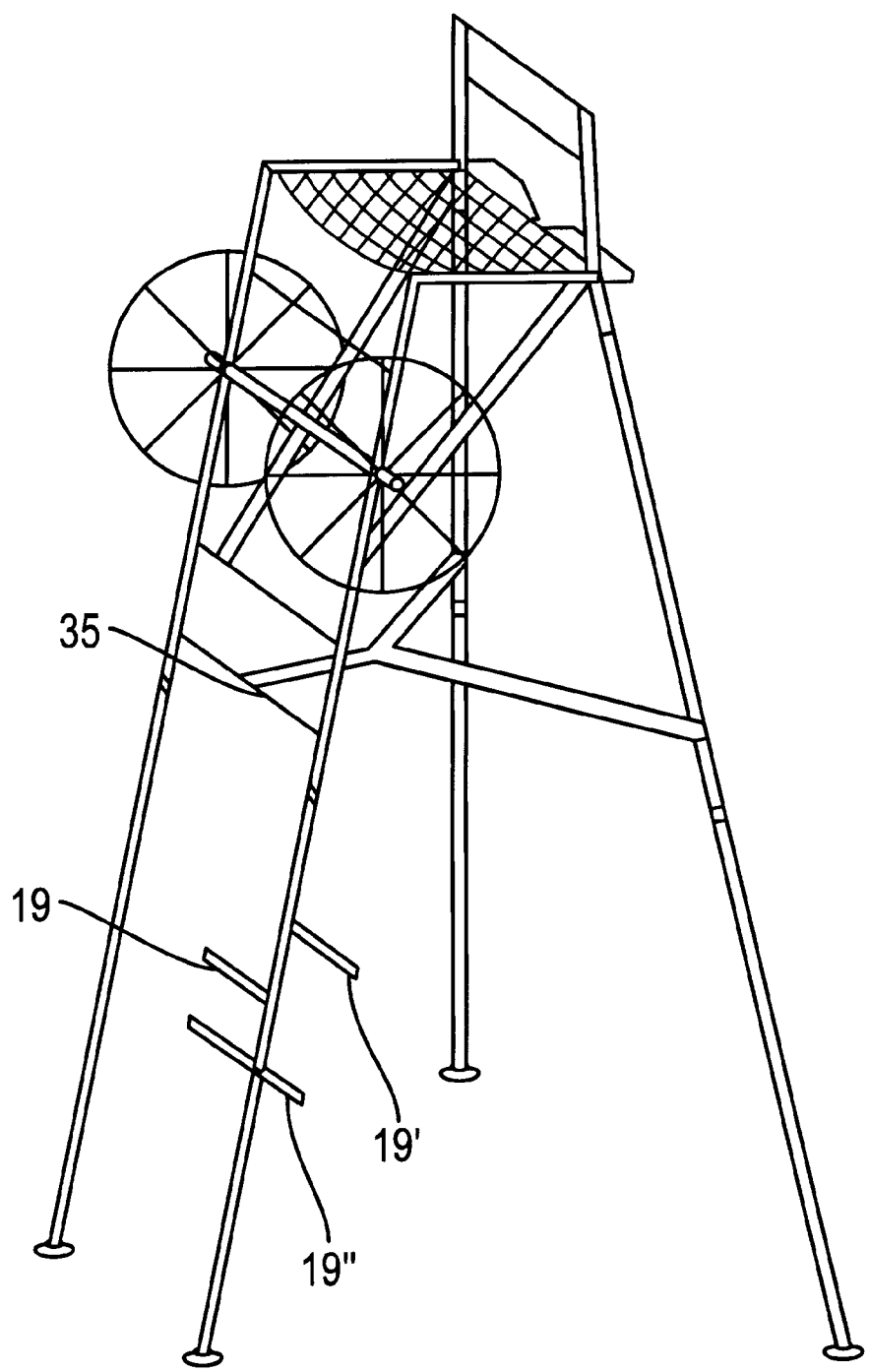
FIG. 1A is a schematic view of the hunting-stand and game-carrier assembly of FIG. 1, shown with alternative climbing aids.

FIG. 1 shows a hunting-stand and game-carrier assembly 10 as a free-standing hunting stand in a fully deployed position whereby a user may be seated on a seat structure 11. The hunting stand 10 has two front leg structures 15 associated with the seat structure 11. In the illustrated embodiment, the front leg structures 15 each are connected directly to the seat structure 11, and have respective upper front leg sections 14 and lower front leg sections 18. Each upper front leg section 14 is pivotally associated with its corresponding lower front leg section 18 by a hinge 16. Each front leg structure 15 has a pad 28 at the distal end thereof constructed and arranged to contact the ground between the leg structures 15 and the ground. A plurality of rungs 17 extend between the front leg structures 15 to define a ladder structure, which enables the user to access the seat structure 11. Alternatively, short or stubby climbing bars 19 could be provided on one or more of the legs, as shown in FIG. 1A. The bars 19 could extend from one side, as at 19' or could extend through the leg as at 19". Where the hunting-stand 10 contains climbing bars 19, cross-leg supports 35 may extend between two leg structures 15 to provide support.

The hunting-stand 10 has at least one and preferably two rear leg structures 25 associated with the seat structure 11. Each of the rear leg structures 25 has upper rear leg section 20 and lower rear leg section 26, which are pivotally connected by a hinge 24. Each rear leg structure 25 preferably has a pad 28 at the end of the leg structure constructed and arranged to contact the ground across a large area. The front leg structures 15 are connected to the rear leg structures 25 by a cross-support 22. Where a single rear leg 25 is used, the cross-support would be turned, as shown in phantom in FIG. 1.

Removable ground-engaging wheels 12 are connected to the front leg structures 15 in a position such that the wheels 12 are coaxially aligned with a cross rung 17. The hunting-stand 10 also comprises a backrest 29 connected to the seat structure 11.

Figure 2:
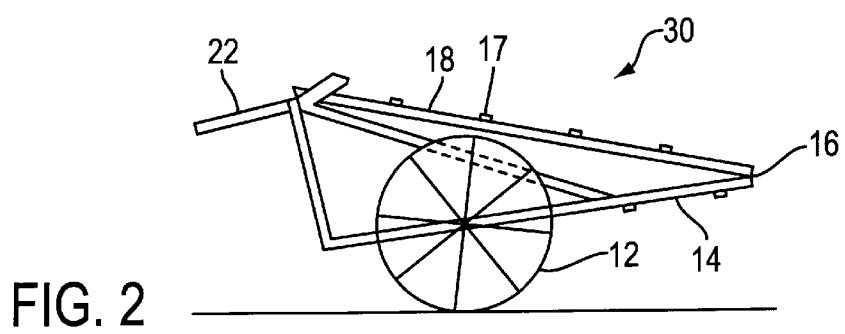
FIG. 2 is a schematic view of the hunting-stand and game-carrier assembly of FIG. 1, shown in a collapsed, game-carrying position.

FIG. 2 shows the hunting-stand and game-carrier assembly in a partially collapsed position as a game carrier 30. Lower front leg sections 18 connected to upper leg sections 14 by hinges 16, are folded back towards the upper leg sections 14 thereby forming the game carrier 30. A plurality of supports, such as rungs 17 or the climbing bars 19, extend between the lower leg sections 18 to enable game to be sufficiently supported for transporting purposes.

Figure 3:
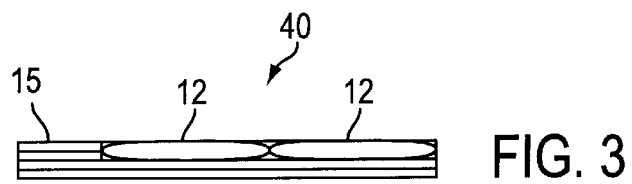
FIG. 3 is a schematic view of the hunting-stand and game-carrier assembly of FIGS. 1 and 2, shown in a storage position.

FIG. 3 shows the hunting-stand and game-carrier assembly 40 in a fully collapsed position where the device is ready for storage. The seat structure (not shown) is pivotal relative to the front leg structures 15 to enable the assembly 40 to collapse in a flat shape. Removable ground-engaging wheels 12 have been disconnected from the front leg structures 15 and are placed within open spaces of the collapsed hunting-stand 40 during storage.

The hunting-stand and game-carrier 10 of FIG. 1 may be modified and varied in a number of ways. One example of a modification to the hunting-stand and game-carrier 10 is that the ground engaging wheels 12 may be coaxially aligned with a rung 17, or the wheels 12 may be associated with the front of the seat structure 11. Another example of a modification where the rear leg structures 25 are detachable from the seat structure 11. The rear leg structures 25 may also be directly attached to the seat structure 11. Furthermore, the rear leg structures 25 may have a plurality of segments that are detachable or pivotal relative to each other.

Referring to FIG. 4, a conventional hunting stand and game-carrier assembly 100 is shown. The hunting-stand and game-carrier assembly 100 is shown supported by a tree 155, having a seat structure 152 which enables a user to be seated in an elevated position. At least two leg structures 154 are associated with the seat structure 152. The leg structures 154 each have an upper section 160, a middle section 162, and a lower section 164. The upper section 160 is pivotally associated with the middle section 162 by a hinge 166. The middle section is pivotally associated with the lower section 164 by a hinge 168. A plurality of rungs 156 extend between the leg structures 154 to define a ladder structure, which enables a user to access the seat structure 152. A cross-support 153 is associated with a rung 156 and engages the tree 155. An angle brace 159 is connected at one end to the seat structure 152. The angle brace 159 is associated with a rung 156 at another end. A footrest 158 is provided at a rung 156 and is associated with the angle brace 159. Straps 151 are used to connect the hunting stand 100 to the tree 155 for added support. A shooting rest 169 is pivotally associated with the front of the seat structure 152 to enable the user to rest a weapon, camera, or his arms thereon.

The hunting-stand of FIG. 4 may employ short or stubby climbing bars 119 as shown in FIG. 4A, rather than rungs 156, on one or more of the leg structures 154. The climbing bars 119 could extend from one side, as at 119', or could extend through the leg as at 119". Where the hunting-stand 100 contains climbing bars 119, cross-leg supports 135 may extend between at least two leg structures 154 to provide support.

Ground-engaging wheels 112 are connected to the leg structures 154 in a position such that the wheels 112 are coaxially aligned with a cross rung 156.

It can be appreciated that the hunting stand 100 of FIG. 4 may be constructed with fewer or more sections to alter the height of the depoloyed hunting stand.

The inventive hunting stand 200 depicted in FIG. 5 is similar to that of FIG. 4 insofar as FIG. 5 illustrates leg structures 290 having sections 274, 276, and 278. Unlike the assembly 100 of FIG. 4, FIG. 5 depicts an additional upper section 272 to further increase the height of the deployed hunting stand and increase visibility for a user perched on the seat structure 286. The upper section 272 is connected to section 274 at hinge joint 280. (Similarly, sections 274 and 276 are pivotally connected at hinge joint 282, and sections 276 and 278 are pivotally connected at hinge joint 284). Although the combination of a rigid cross support 288 connecting between a rung 275 and the tree 277 and straps (unnumbered) provide adequate support for smaller structures such as shown in FIG. 4, additional stabilization and increased weight capacity are highly desirable for taller assemblies, such as the one illustrated in FIG. 5. Accordingly, per another embodiment of this invention, an angular rigid brace 270 is provided. The brace 270 is constructed and arranged to permit one end to couple a portion of the cross support 288 located in proximity to the tree 277 and the other end to couple to one of the plurality of rungs 275 so that the brace 270 extends at an angle relative to the cross brace 270. The cross-support 288 and the brace 270 collectively define a Y-shaped support structure.

Figure 6A:
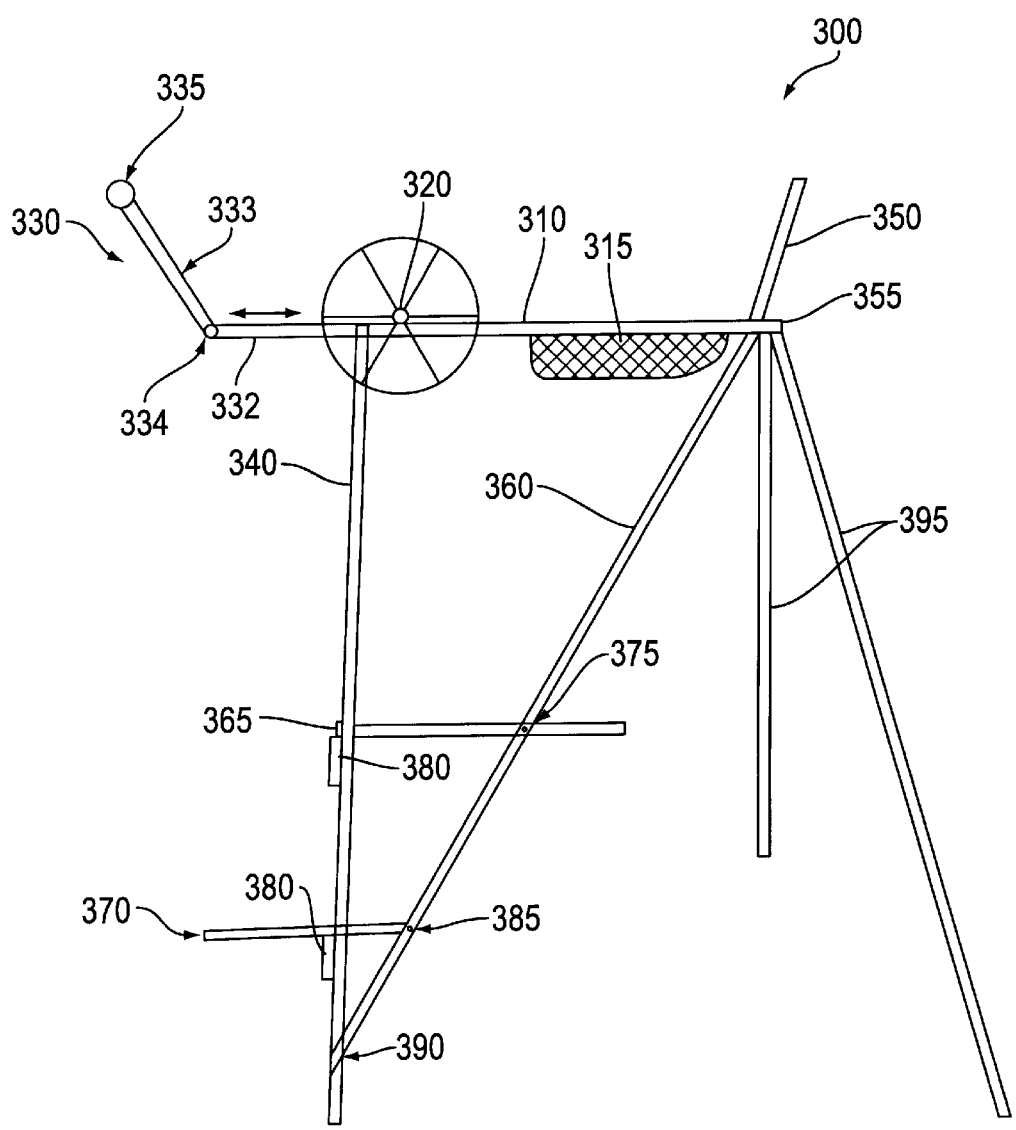
FIG. 6A is a schematic view of a hunting-stand and game-carrier assembly having a plurality of platforms and a shooting rest, with the shooting rest depicted in an upper position.

FIG. 6A shows the hunting-stand and game-carrier assembly 300 in an arrangement whereby more than one user may occupy the hunting-stand 300. The hunting-stand 300 has a seat structure 310 with a mesh web 315 to enable one user to sit in an elevated position. Two front leg structures 340 are associated with the seat structure 310. Two rear leg structures 395 are associated with the seat structure 310. A plurality of rungs 380 extend between the front leg structures 340 to define a ladder structure. An angle brace 360 is associated with the seat structure 310 and to the front leg structures 340. A middle platform 365 is associated with the angle brace 360 by a hinge 375, and is supported by a rung 380. This middle platform 365 may be used as a footrest by the user seated on the seat structure 310 or may be used as a seat for a second user. A lower platform 370 is associated with the angle brace 360 by a hinge 385, and is supported by a rung 380. The lower platform 370 may be used as a footrest for a user sitting on the middle platform 365.

Figure 6B:
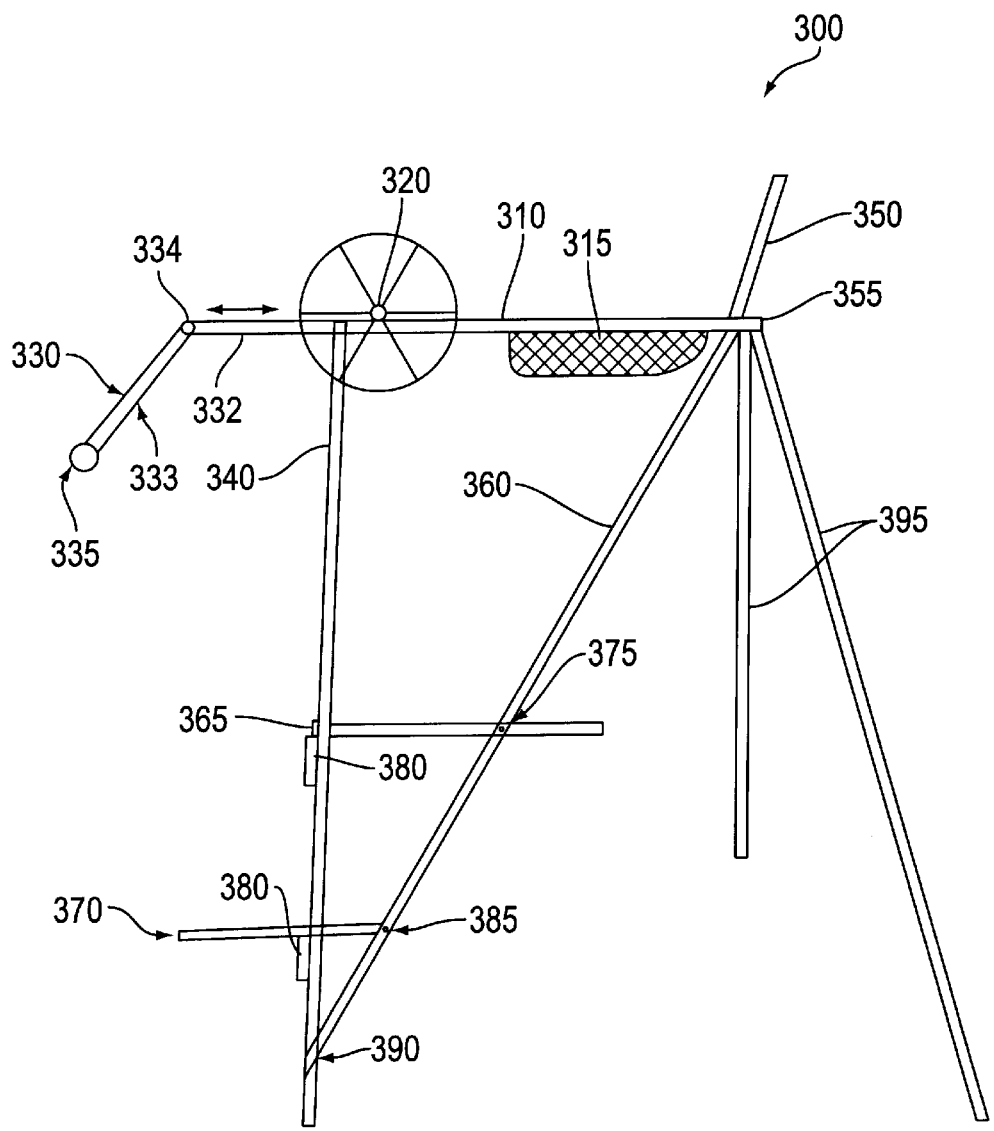
FIG. 6B is a schematic view of the hunting-stand and game-carrier assembly of FIG. 6A depicting the shooting rest in a lower position.
Figure 6C:
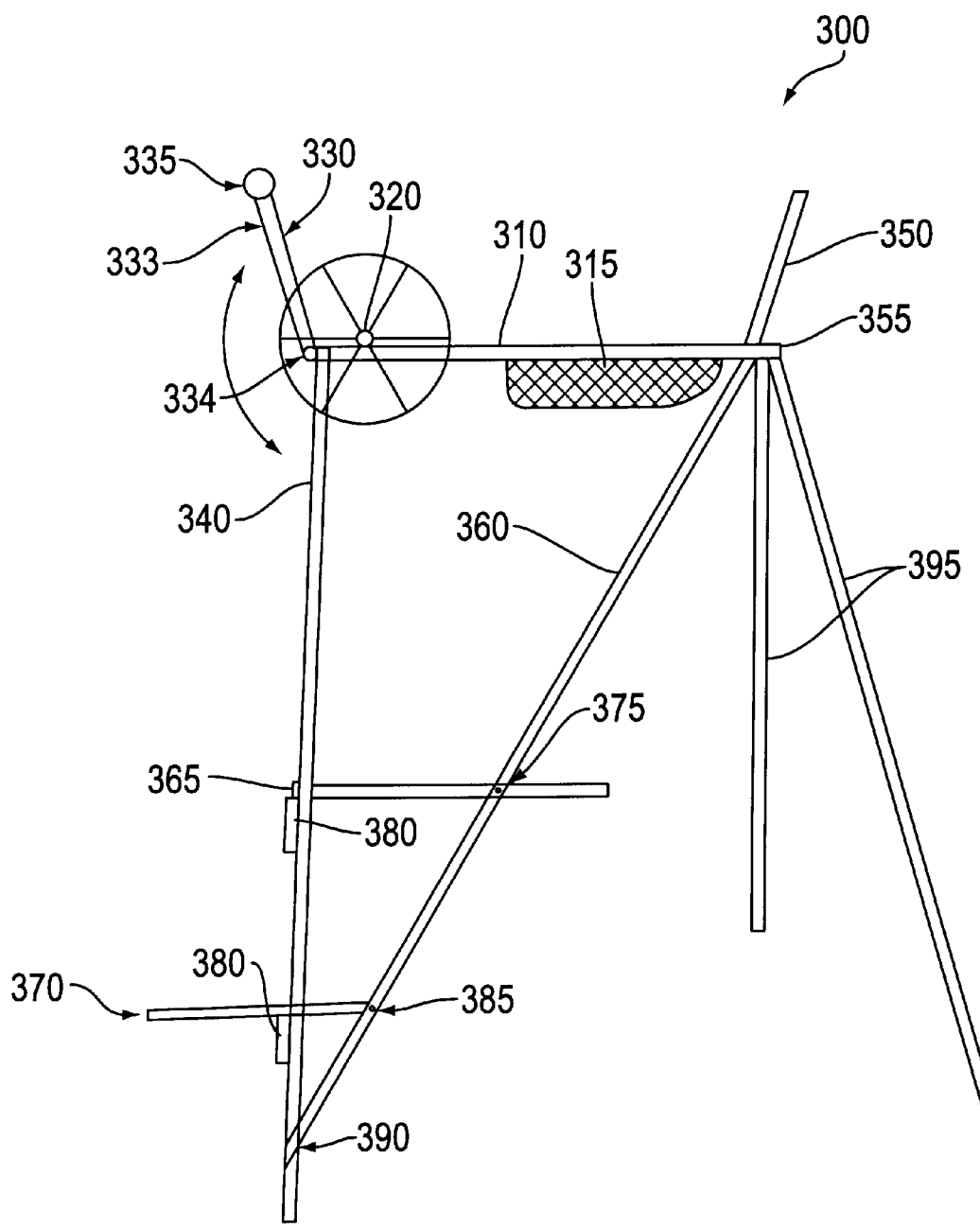
FIG. 6C is a schematic view of the hunting-stand and game-carrier assembly of FIGS. 6A and 6B depicting the shooting rest in position toward the user.

The hunting-stand 300 includes an adjustable shooting rest 330 which is associated with the seat structure 310 to permit the rest 330 to be moved into several functional positions. The shooting rest 330 has longitudinally slidable bars 332 capable of sliding toward and away from the seat structure 310 and telescopically received in the seat structure 310. Extending bars 333 are pivotally connected to the slidable bars 332 by hinge joints 334. A resting bar 335 extends perpendicularly between the extending bars 333. As shown in FIG. 6A the adjustable shooting rest is positioned in an upper position for use by a person seated in the seat structure 310. FIG. 6B shows the adjustable shooting rest 330 positioned downward position for use by a person seated on the middle platform 365. FIG. 6C shows the hunting stand 300 of FIGS. 6A and 6B wherein the adjustable shooting rest 330 moved toward the seat structure 310, so that portion 332 is received with portion 310 to permit the shooting rest to be pivoted downward to 340 and serve as a rung.

Figure 7:
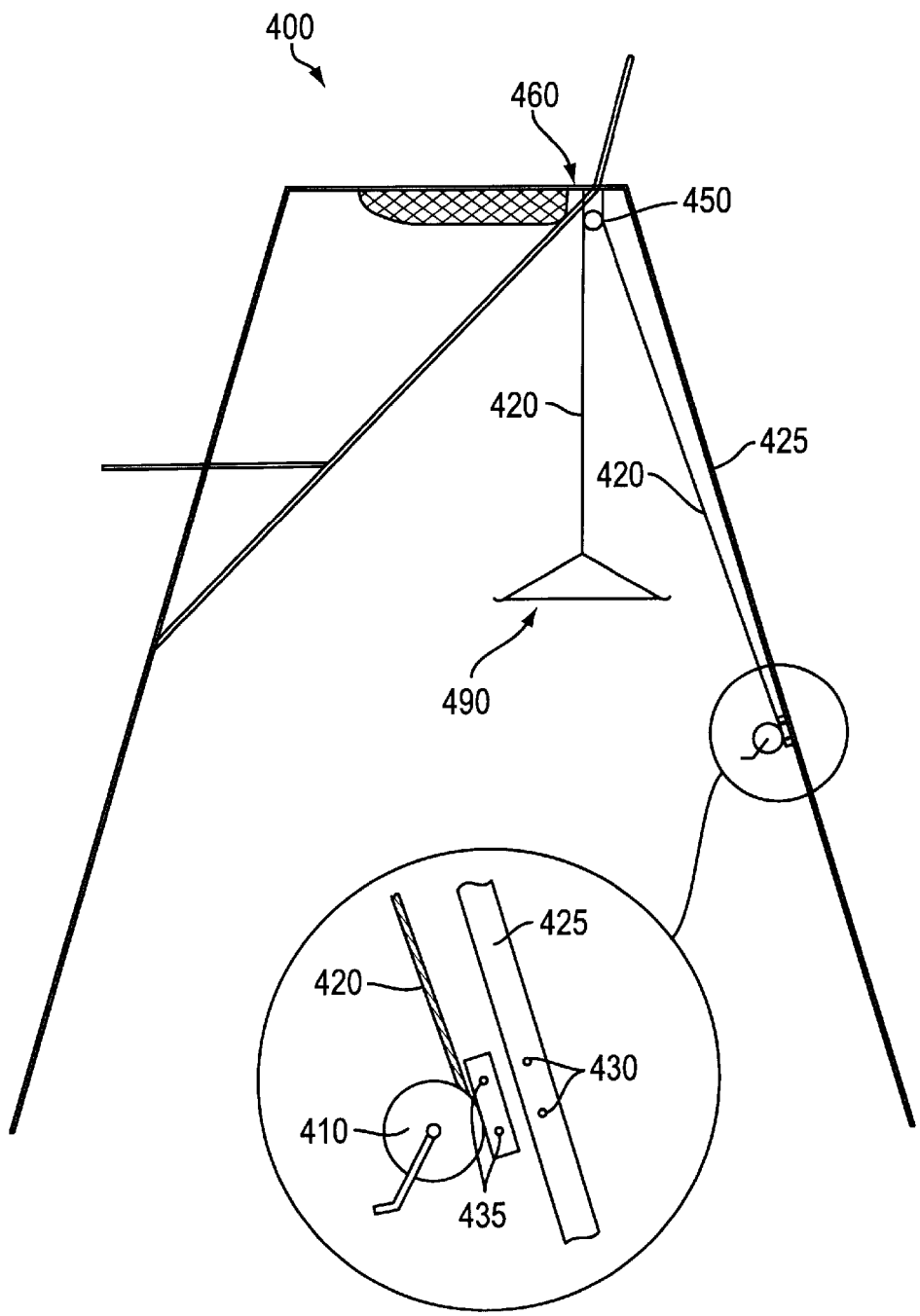
FIG. 7 is a schematic view of a hunting-stand and game-carrier assembly shown as a skinning post.

FIG. 7 shows another variation hunting-stand and game-carrier assembly 400 depicting the free-standing hunting stand in a fully deployed position with a skinning post subassembly. A winch 410 is attached to a leg 425 by, for example, quick connect pins (not shown) inserted in aligned holes 430 and 435 of the leg 425 and the winch 410, respectively. A pulley 450 is attached to the seat structure 460. A rope 420 has one of its ends wrapped around and thereby connected to the barrel of the winch 410. The rope 420 is fed over the pulley 450 and hangs downward, with a game hanger 490 attached at the other end of the rope 420. Rotation of the winch 410 spools and unspools the rope 420 therearound to move the hanger 490 vertically. The hanger 490 is detachable from the end of the rope 420 to permit the rope 420 to be spooled about and stored around the winch 410.

The foregoing detailed description of the embodiments of the invention has been provided for the purposes of illustration and description. It is not intended to be exhaustive or to limit the invention to the precise embodiments disclosed. The embodiments were chosen and described to best explain the principles of the invention and its practical application, thereby enabling others skilled in the art to understand the invention. While the invention has been described in connection with what is presently considered to be the most practical and preferred embodiments, it is understood that the invention is not limited to the disclosed embodiments. To the contrary, this invention is intended to cover various modifications and equivalent arrangements included within the spirit and scope of the appended claims.

What is claimed is:

1. A collapsible hunting-stand and game-carrier assembly comprising:

a seat structure;

at least three legs associated with said seat structure, at least two legs of said at least three legs comprising respective upper and corresponding lower sections movable relative to each other between (a) a deployed position, in which said upper sections are substantially aligned with and supported by said corresponding lower sections to extend said at least two legs away from said seat structure and provide part of a free-standing multi-pod base from which said seat structure is elevated above the ground, and (b) a collapsed position, in which said lower sections are folded back towards said upper leg sections so that said assembly is transportable;

a plurality of climbing aids connected to at least one leg of said at least three legs, said climbing aids being relatively spaced (a) to provide the user with access to said seat structure when said at least two legs are in the deployed position and (b) to provide a carrier base for holding game when said at least two legs are in the collapsed position; and an adjustable shooting rest connected to said seat structure, wherein said shooting rest comprises:

longitudinally slidable bars slidable toward and away from said seat structure;

extending bars respectively pivotally connected to the slidable bars by hinges; and a resting bar extending between and perpendicular to said extending bars.

2. A collapsible hunting-stand and game-carrier assembly according to claim 1, wherein said at least two legs are detachable from said seat structure.

3. A collapsible hunting-stand and game-carrier assembly according to claim 2, wherein said at least two legs comprise a plurality of segments that are detachable or pivotal relative to each other.

4. A collapsible hunting-stand and game-carrier assembly according to claim 1, wherein said climbing aids include rungs.

5. A collapsible hunting-stand and game-carrier assembly according to claim 1, further comprising at least one cross-support constructed and arranged to maintain relative positioning of said at least three legs when each of said at least three legs are in the deployed position, said cross-support being rigid and generally horizontally oriented in the deployed position.

6. A collapsible hunting-stand and game-carrier assembly according to claim 5, wherein said horizontally-oriented cross-support is Y-shaped and has a first end portion engageable with one of said climbing aids and second and third end portions engageable with respective ones of said at least three legs.

7. A collapsible hunting-stand and game-carrier assembly according to claim 1, wherein said upper and corresponding lower sections are pivotal relative to each other.

8. A collapsible hunting-stand and game-carrier assembly according to claim 1, wherein said at least two legs are pivotal relative to said seat structure when in the collapsed position.

9. A collapsible hunting-stand and game-carrier assembly according to claim 1, wherein said seat structure comprises a mesh web.

10. A collapsible hunting-stand and game-carrier assembly according to claim 1, further comprising a lower platform supported by at least some of said at least three legs and constructed and arranged to enable a second user to rest thereon as a first user rests on the seat structure thereabove.

11. A collapsible hunting-stand and game-carrier assembly according to claim 1, wherein said at least two legs are attached directly to said seat structure.

12. A collapsible hunting-stand and game carrier assembly according to claim 1, wherein said at least three legs comprise two front legs and two rear legs.

13. A collapsible hunting-stand and game carrier assembly according to claim 1, wherein said sections are further movable to a substantially flat storage position.

14. A hunting-stand and game carrier assembly comprising:

a seat structure constructed and arranged to enable a user to rest thereon so as to be elevated above the ground;

at least two leg structures associated with said seat structure, said leg structures comprising respective upper and corresponding lower sections movable relative to each other between (a) a deployed position, in which said upper sections are substantially aligned with and supported by said corresponding lower sections so that said leg structures extend away from said seat structure to provide part of a multi-pod base constructed and arranged to permit said seat structure to be elevated above the ground and supported against a stationary structure, and (b) a collapsed position, in which said lower sections are folded back towards said upper leg sections;

a plurality of climbing aids connected to at least one leg structure, said climbing aids being relatively spaced (a) to provide the user with access to said seat structure when said leg structures are in the deployed position and (b) to provide a carrier base for holding game when said leg structures are in the collapsed position;

at least first and second rigid cross-supports constructed and arranged to maintain relative positioning of said leg structures when in the deployed position, said first and second rigid cross supports having respective first ends which are attachable to different ones of said climbing aids, said first and second rigid cross supports have respective second ends, with said second end of said second rigid cross support being attachable to said first rigid cross support; and an adjustable shooting rest connected to said seat structure, wherein said shooting rest comprises:
longitudinally slidable bars slidable toward and away from said seat structure;
extending bars respectively pivotally connected to the slidable bars by hinges; and
a resting bar extending between and perpendicular to said extending bar.

15. A hunting-stand and game-carrier assembly according to claim 14, wherein said at least two legs are detachable from said seat structure.

16. A hunting-stand and game-carrier assembly according to claim 15, wherein said at least two legs comprise a plurality of segments that are detachable or pivotal relative to each other.

17. A hunting-stand and game-carrier assembly according to claim 14, wherein said climbing aids include rungs.

18. A hunting-stand and game-carrier assembly according to claim 17, wherein at least one of said cross-supports is rigid and horizontally oriented and has a Y-shape with a first end portion engageable with one of said climbing aids and second and third end portions that embrace the stationary structure.

19. A hunting-stand and game-carrier assembly according to claim 14, wherein said upper and corresponding lower sections are pivotal relative to each other.

20. A hunting-stand and game-carrier assembly according to claim 14, wherein said at least two legs are pivotal relative to said seat structure when in the collapsed position.

21. A hunting-stand and game-carrier assembly according to claim 14, wherein said seat structure comprises a mesh web.

22. A hunting-stand and game-carrier assembly according to claim 14, further comprising a lower platform supported by at least one of said at least two leg structures, and constructed and arranged to enable a second user to rest thereon as a first user rests on the seat structure thereabove.

23. A hunting-stand and game-carrier assembly according to claim 14, wherein said at least two legs are attached directly to said seat structure.

24. A hunting-stand and game carrier assembly according to claim 14, wherein said assembly is further movable to a substantially flat storage position.

* * * * *